3,009,934
2β-HALO-3α-HYDROXY-5α-ANDROSTAN-17-ONES
AND DERIVATIVES THEREOF
Raymond Counsell and Paul D. Klimstra, Skokie, Ill.,
assignors to G. D. Searle & Co., Chicago, Ill., a corporation of Delaware
No Drawing. Filed June 6, 1960, Ser. No. 33,949
7 Claims. (Cl. 260—397.4)

The present invention relates to 2-halosteroids of the androstane series and, more particularly, to 2β-halo-3α-hydroxy-5α-androstan-17-ones and derivatives thereof, as represented by the structural formulae

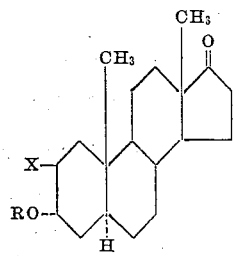

and

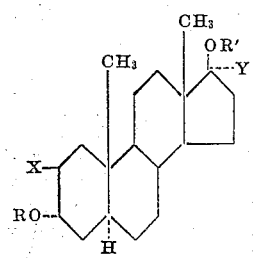

wherein X is selected from the group of substituents consisting of fluoro, chloro, and iodo; R and R' are members of the class consisting of hydrogen and lower alkanoyl radicals; and Y is hydrogen, a lower alkyl radical or a lower alkynyl radical.

The lower alkanoyl radicals encompassed by the R term are, for example, formyl, acetyl, propionyl, butyryl, valeryl caproyl and the branched-chain isomers thereof.

Lower alkyl radicals represented by Y are methyl ethyl, propyl, butyl, pentyl, hexyl, and the branched-chain isomers thereof.

The lower alkynyl radicals designated by Y in the structural representation supra are exemplified by ethynyl, propynyl, butynyl, pentynyl, hexynyl, and the branched-chain isomers thereof.

A starting material suitable for the manufacture of the compounds of this invention is 3β-p-toluenesulfonoxy-5α-androstan-17-one, which is illustrated by the structural formula

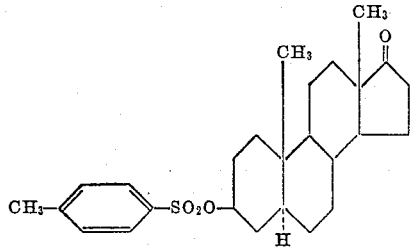

A solution of this sulfonate in a high-boiling solvent such as collidine is heated at reflux to afford 5α-endrost-2-en-17-one. Epoxidation of this olefin with perbenzoic acid in benzene results in 2α,3α-epoxy-5α-androstan-17-one. This epoxide, when treated with the appropriate hydrogen halide, affords the 17-keto halohydrins of this invention. The process can be illustrated as follows:

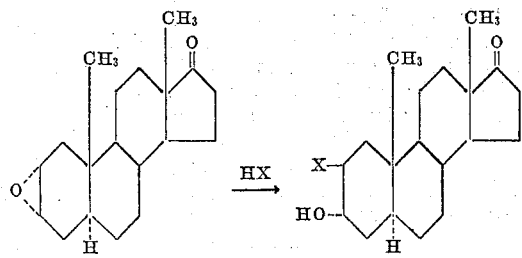

Typically, a solution of 2α,3α-epoxy-5α-androstan-17-one in chloroform is allowed to react with a concentrated aqueous solution of hydrogen iodide at room temperature to afford 3α-hydroxy-2β-iodo-5α-androstan-17-one.

A preferred method for preparation of the instant 2β-fluoro-17-oxo derivative involves reaction of the aforementioned epoxide with hydrogen fluoride in an anhydrous medium such as a mixture of chloroform and tetrahydrofuran. The major part of the reaction is completed at a temperature of about 0° C.

Reduction of the instant 17-keto compounds, typically with sodium borohydride, results in the 17-hydroxy compounds of this invention. As a specific example of this process, 2β-chloro-3α-hydroxy-5α-androstan-17-one in aqueous methanol is treated with sodium borohydride to yield 2β-chloro-5α-androstane-3α,17β-diol.

In order to obtain the 17α-(lower alkyl)-17β-hydroxy compounds illustrated in the foregoing structural formula, the aforementioned 5α-androst-2-en-17-one is treated with an alkyl magnesium bromide to afford the 17α-(lower alkyl)androst-2-en-17β-ols. Treatment of these olefins with perbenzoic acid to afford the epoxides followed by reaction of the latter substances with a hydrogen halide by the process described supra, affords the instant 17α-(lower alkyl)-17β-hydroxy halohydrins. By this series of reactions, for example, 5α-androst-2-en-17-one is treated with methyl magnesium bromide to produce 17α-methylandrost-2-en-17β-ol, which is epoxidized to afford 2α,3α - epoxy - 17α - methyl - 5α - androstan - 17β - ol. Reaction of this epoxide with hydrogen chloride in the aforementioned manner affords 2β-chloro-17α-methyl-5α-androstane-3α,17β-diol.

In a similar manner to that described supra, the aforementioned 5α-androst-2-en-17-one can be reacted with a lower 1-alkyne in the presence of an alkaline catalyst such as potassium hydroxide to introduce the 17α-(1-alkynyl)-17β-hydroxy grouping. Epoxidation to afford the corresponding epoxide followed by treatment of the latter substance with a hydrogen halide results in the instant 17α-(1-alkynyl)-17β-hydroxy halohydrins. When acetylene, for example, is employed as the alkyne and hydrogen chloride as the hydrogen halide, the resulting instant final product is 2β-chloro-17α-ethynyl-5α-androstane-3α,17β-diol.

A preferred method for preparation of the instant 17α-(lower alkyl) compounds in which the alkyl radical contains more than one carbon atom, involves catalytic reduction of the aforementioned 17α-(1-alkynyl) derivatives. For example, 2β-chloro-17α-ethynyl-5α-androstane-3α,17β-diol is treated with hydrogen in the presence of a suitable hydrogenation catalyst to yield 2β-chloro-17α-ethyl-5α-androstane-3α,17β-diol.

The 3α-(lower alkanoates) of this invention can be manufactured by reaction of the instant halohydrins with an appropriate lower alkanoic acid anhydride. As a specific example, 2β-chloro-3α-hydroxy-5α-androstan-17-one is acylated with acetic anhydride in pyridine to yield 3α-acetoxy-2β-chloro-5α-androstan-17-one.

The compounds of this invention are useful as a result of their valuable pharmacological properties. They are, for example, potent hypocholesterolemic agents as evidenced by their ability to inhibit hepatic synthesis of cholesterol, which property is surprisingly not shared by the related 2β-bromo compounds of the prior art.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 5 parts of 3β-p-toluenesulfonyloxy-5α-androstan-17-one and 350 parts of purified collidine is stirred and heated at reflux for about 4 hours. This reaction mixture is cooled, then treated with ice and 500 parts by volume of 1 N sulfuric acid. The resulting mixture is extracted with ether, and the organic layer is washed successively with ice-cold 1 N sulfuric acid, aqeous sodium bicarbonate, and water. This washed solution is dried and decolorized over a mixture of anhydrous sodium sulfate and activated carbon, then evaporated to dryness to afford 5α-androst-2-en-17-one, M.P. 103–105°. Recrystallization from methanol affords a pure sample, M.P. 105–106.5°; $[\alpha]_D = +163°$ (chloroform).

Example 2

To a solution of 8.4 parts of perbenzoic acid in 128 parts of benzene, cooled to 5°, is added 15 parts of 5α-androst-2-en-17-one, and the mixture is stirred until homogeneous, then stored at 5° for about 24 hours. The solution is allowed to come to room temperature, and washed successively with aqueous sodium carbonate and water, dried over anhydrous potassium carbonate, and evaporated to dryness to afford a solid residue. Recrystallization from methanol affords pure 2α,3α-epoxy-5α-androstan-17-one, M.P. about 123–126°; $[\alpha]_D = +104°$ (chloroform).

Example 3

To a solution of 4 parts of 2α,3α-epoxy-5α-androstan-17-one in 375 parts of chloroform is added 131 parts of concentrated hydrochloric acid, and the heterogeneous mixture is shaken mechanically for about 20 minutes. The organic layer is separated, washed successively with aqueous sodium carbonate and water, dried and decolorized over a mixture of anhydrous sodium sulfate and activated carbon, and evaporated to yield a white solid. Recrystallization from aqueous ethanol results in 2β-chloro-3α-hydroxy-5α-androstan-17-one, M.P. 197–199° (decomposition); $[\alpha]_D = 92°$ (chloroform).

Example 4

Into a solution consisting of 21 parts of chloroform and 34 parts of purified tetrahydrofuran, cooled by means of an ice-aclcium chloride bath, is bubbled 20.8 parts of anhydrous hydrogen fluoride. To this cooled and stirred mixture is added a solution of 12 parts of 2α,3α-epoxy-5α-androstan-17-one in 96 parts of chloroform over a period of about 2½ hours, during which time the addition of hydrogen fluoride is continued. The cooling bath is then removed and the reaction mixture is stirred for about 1½ hours longer, then poured slowly into about 1,050 parts of concentrated aqueous potassium carbonate. This mixture is extracted with chloroform, and the organic extract is washed successively with water, aqueous sodium bicarbonate, and water; then dried and decolorized over a mixture of anhydrous potassium carbonate and activated carbon. Evaporation of the solvents results in a yellow oil, which is adsorbed on silica gel and eluted with benzene-ethyl acetate to afford 2β-fluoro-3α-hydroxy-5α-androstan-17-one. Recrystallization from acetone-hexane yields a pure sample, M.P. about 184–185°; $[\alpha]_D = +97°$ (chloroform).

Example 5

To a solution of 1.5 parts of 2α,3α-epoxy-5α-androstan-17-one in 112 parts of chloroform is added 27.5 parts of 47% aqueous hydrogen iodide, and the heterogeneous mixture is shaken mechanically for about 20 minutes. The chloroform layer is separated, washed successively with aqueous sodium bicarbonate, aqueous sodium thiosulfate, and water, and dried and decolorized over a mixture of anhydrous potassium carbonate and activated carbon. The solvent is evaporated in vacuo leaving a glasslike residue, which is crystallized from aqueous ethanol to yield 3α-hydroxy-2β-iodo-5α-androstan-17-one, M.P. about 139.5° (decomposition).

Example 6

A mixture of 4 parts of 2β-fluoro-3α-hydoxy-5α-androstan-17-one, 20 parts of acetic anhydride, and 40 parts of pyridine is allowed to stand at room temperature for about 3½ hours, then poured slowly into water. The resulting mixture is extracted with ether, and the organic solution is evaporated to dryness to afford an oily residue. Crystallization of this residue from aqueous methanol results in 3α-acetoxy-2β-fluoro-5α-androstan-17-one, M.P. 123–125°; $[\alpha]_D = +113.5°$ (chloroform).

The substitution of an equivalent quantity of propionic anhydride in the process of this example results in 2β-fluoro-3α-propionoxy-5α-androstan-17-one.

Example 7

A mixture of 6.5 parts of 2β-chloro-3α-hydroxy-5α-androstan-17-one, 37.5 parts of acetic anhydride, and 75 parts of pyridine is stored at room temperature for about 15 hours, then diluted with several volumes of water. The resulting mixture is extracted with ether, and the organic layer is evaporated to dryness. The residue is recrystallized from methanol to produce 3α-acetoxy-2β-chloro-5α-androstan-17-one, M.P. 161–164°; $[\alpha]_D = 96.5°$ (chloroform).

By substituting an equivalent quantity of propionic anhydride and otherwise proceeding according to the herein-described processes, 2β-chloro-3α-propionoxy-5α-androstan-17-one is obtained.

Example 8

A mixture of one part of 3α-hydroxy-2β-iodo-5α-androstan-17-one, 5 parts of acetic anyhydride, and 10 parts of pyridine is allowed to stand at room temperature, under nitrogen, for about 5 hours; then poured into a mixture of ice and water. The resulting precipitate is collected by filtration, washed successively with dilute hydrochloride acid, aqueous sodium bicarbonate, and water; then dried to afford 3α-acetoxy-2β-iodo-5α-androstan-17-one. Recrystallization from methanol affords the pure material, M.P. 135–136° (decomposition); $[\alpha]_D = +144°$ (chloroform).

What is claimed is:
1. A compound of the structural formula

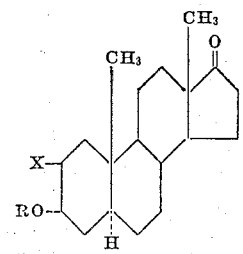

wherein R is selected from the group consisting of hydrogen and lower alkanoyl radicals and X is a member of the class consisting of fluoro, chloro, and iodo substituents.

2. 2β-chloro-3α-hydroxy-5α-androstan-17-one.
3. 2β-fluoro-3α-hydroxy-5α-androstan-17-one.
4. 3α-hydroxy-2β-iodo-5α-androstan-17-one.
5. 3α-acetoxy-2β-chloro-5α-androstan-17-one.
6. 3α-acetoxy-2β-fluoro-5α-androstan-17-one.
7. 3α-acetoxy-2β-iodo-5α-androstan-17-one.

No references cited.